United States Patent [19]

McFarland

[11] 3,992,985
[45] Nov. 23, 1976

[54] APPARATUS FOR PROCESSING MEAT MATERIAL WITH CARBON DIOXIDE

[75] Inventor: Archie Rae McFarland, Salt Lake City, Utah

[73] Assignee: Beehive Machinery Inc., Salt Lake City, Utah

[22] Filed: Sept. 15, 1975

[21] Appl. No.: 613,084

Related U.S. Application Data

[60] Continuation of Ser. No. 429,838, Jan. 2, 1974, which is a division of Ser. No. 274,574, July 24, 1972, Pat. No. 3,825,231.

[52] U.S. Cl. ................................. 99/478; 259/6
[51] Int. Cl.² ..................... A22C 5/00; B01F 7/08
[58] Field of Search ............ 99/467, 477, 478, 471; 241/47; 426/519; 259/6

[56] References Cited
UNITED STATES PATENTS

| | | | |
|---|---|---|---|
| 2,907,662 | 10/1959 | Covey | 426/371 |
| 3,147,784 | 9/1964 | Sloan | 241/47 |
| 3,825,231 | 7/1974 | McFarland | 259/41 |

FOREIGN PATENTS OR APPLICATIONS

| | | | |
|---|---|---|---|
| 669,982 | 9/1963 | Canada | 241/82.1 |
| 315,349 | 11/1919 | Germany | 241/82.1 |

Primary Examiner—Leonard D. Christian
Assistant Examiner—Alan Cantor
Attorney, Agent, or Firm—Mallinckrodt & Mallinckrodt

[57] ABSTRACT

Conveyor screws located in side-by-side relationship on fixed, substantially horizontal axes at the bottom of a closed vessel are adapted to be rotated to provide mixing action. Means are provided for continuously supplying the vessel with meat material and with carbon dioxide. There is a discharge outlet in alignment with one of the conveyor screws, so mixed material will be continuously discharged from the vessel.

12 Claims, 5 Drawing Figures

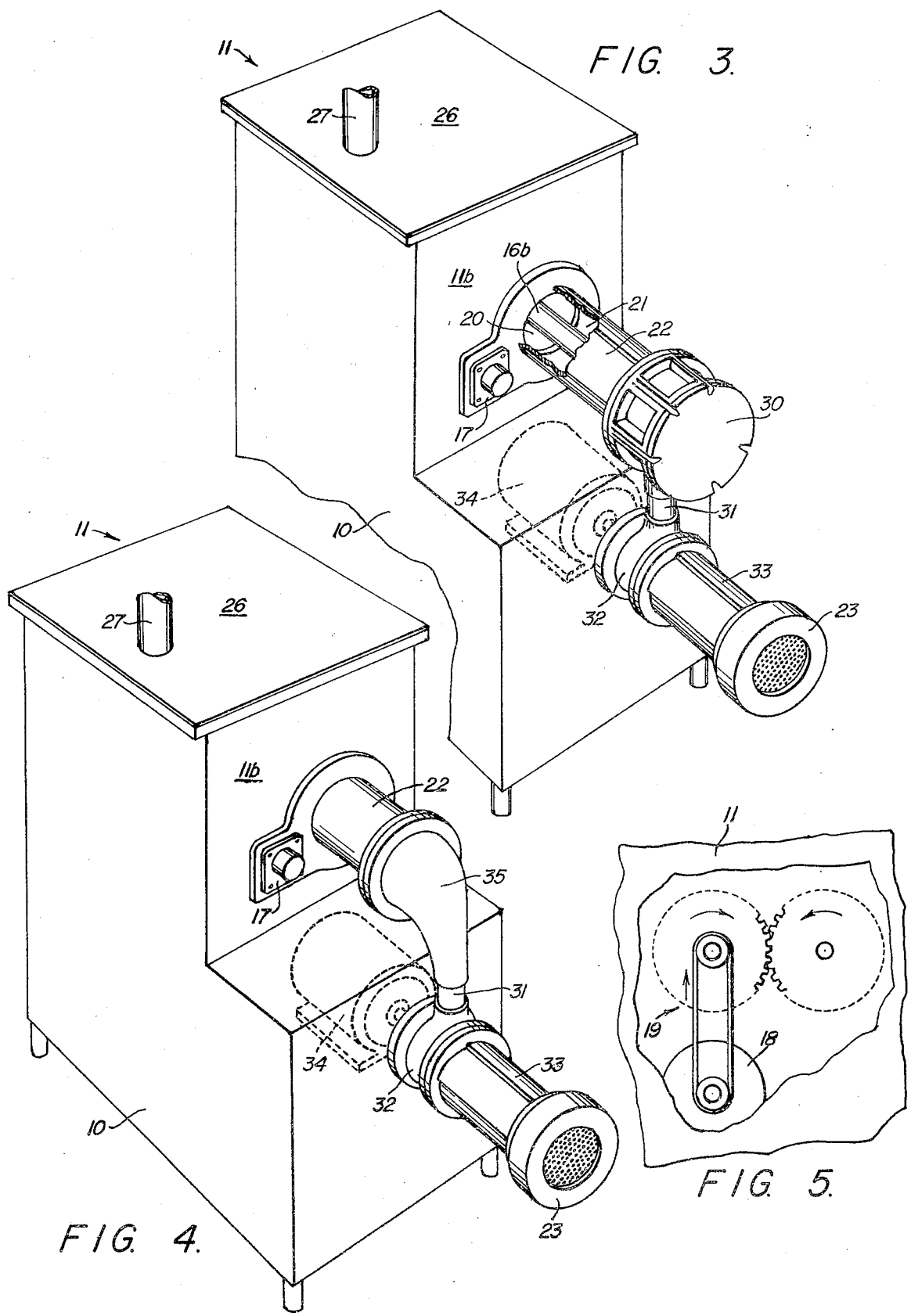

APPARATUS FOR PROCESSING MEAT MATERIAL WITH CARBON DIOXIDE

RELATED APPLICATION

The present invention is a continuation of application Ser. No. 429,838 filed Jan. 2, 1974, which, in turn, was a division of application Ser. No. 274,574, filed July 24, 1972, now as U.S. Pat. No. 3,825,231 on July 23, 1974.

BACKGROUND OF THE INVENTION

1. Field:

The invention is in the field of processing meat materials with carbon dioxide.

2. State of the Art:

Material mixing machines have long been constructed with a plurality of screws or beaters rotatably mounted within a mixing vessel. In at least one instance, U.S. Pat. No. 3,430,424, such a machine has been constructed for continuous operation on material continuously introduced at one end of a mixing vessel and continuously discharged at the opposite end.

SUMMARY OF THE INVENTION

In accordance with the present invention, a closed vessel is provided with conveyor screws at its bottom in side-by-side relationship on fixed horizontal axes and with means for rotating such screws so as to effect mixing action. The vessel is also provided with means for continuously supplying meat material to the interior thereof and with means for continuously supplying carbon dioxide to the interior thereof. The vessel has a discharge outlet in alignment with one of the conveyor screws, so mixed material will be continuously discharged. Twin screws are preferably located peripherally of the bottom of the vessel to provide a peripheral path of travel for the material charged into the vessel, one screw serving to transfer the material to the other whose discharge end is substantially axially aligned with a discharge outlet from the vessel. The vessel is usually arranged as a feed hopper discharging into a passage leading to material-processing mechanism, such as a grinder, deboner, etc.

It is advantageous that troughs be formed in the bottom of the vessel for the respective screws and that material transfer means be provided at the discharge end of the transfer screw. As such transfer means, a paddle attached to the transfer screw serves effectively to raise material from one trough and pass it on into the feed end of the discharge screw in the second trough. As a safety measure, or, under some circumstances, to provide a longer mixing time in the vessel, a by-pass around the discharge outlet is provided, desirably by notching the ridge between the two troughs at the discharge end thereof. Thus, if there is an inadvertent stoppage in the discharge passage leading from the machine, as may sometimes happen if the grinder or deboning equipment, etc., clogs, or if stoppage is purposely caused, as by closing a valve to improve mixing, closed circuit circulation within the vessel takes place.

In many instances, it may be desirable to interpose a pump in the discharge passage to provide pressure feeding of material to the grinder, deboner, or other processing mechanism.

THE DRAWINGS

The best mode presently contemplated of carrying out the invention in actual practice is disclosed on the basis of several different specific embodiments of meat grinders, as illustrated in the accompanying drawings, in which:

FIG. 1 is a pictorial view, looking from front to rear, of one form of meat grinder embodying the invention, the cover and, a portion of the feed hopper being broken away to reveal twin screws and the material-transfer ends thereof, the drive mechanism being indicated schematically in dotted lines;

FIG. 2, a similar but fragmentary view of the same machine looking from the rear to front to show a by-pass arrangement and with meat and carbon dioxide inputs;

FIG. 3, a view similar in some respects to that of FIG. 1, but showing a pump interposed between hopper outlet and grinder, with separate drives for screws and pump and for the grinder;

FIG. 4, a view corresponding to FIG. 3, but showing the pump replaced with an elbow conduit for conducting the material to the separately driven grinder; and FIG. 5, a fragmentary view in rear elevation showing typical drive mechanism for the twin screws.

DETAILED DESCRIPTION OF ILLUSTRATED EMBODIMENT

In the illustrated embodiment, the invention is incorporated in meat grinding equipment and several different versions of such equipment are disclosed. The material-receiving vessel is of the nature of a feed hopper for continuously passing material into processing mechanism.

Figure 1:
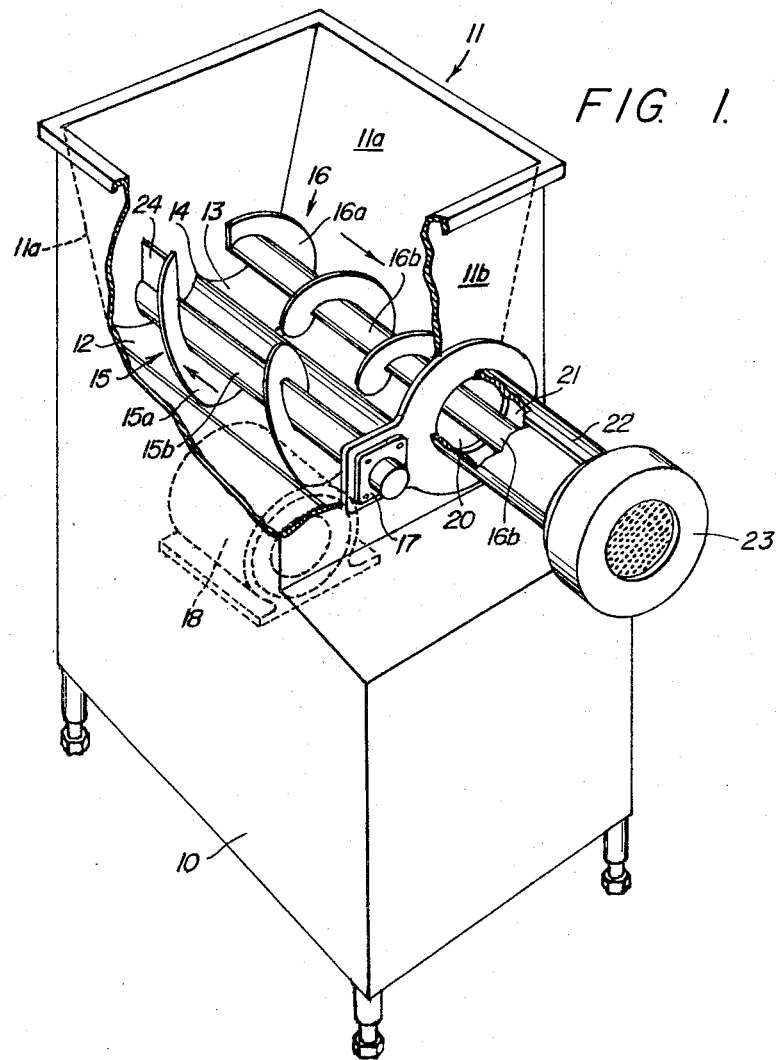

In FIG. 1, the processing equipment of the invention comprises a housing 10 whose upper part is formed as an feed hopper 11. Such feed hopper has convergent lateral walls 11a, 11a interiorly thereof and a bottom wall forming a pair of elongate, mutually parallel, troughs 12 and 13 lying side-by-side peripherally of the bottom of the hopper and separated by a ridge 14.

Rotatably mounted in the troughs 12 and 13 is a pair of conveyor screws 15 and 16, respectively, comprising helical flights 15a and 16a, respectively, secured to and extending along shafts 15b and 16b, respectively, such shafts being journaled in suitable bearings, such as 17 mounted on the front wall 11b of hopper 11.

The screws 15 and 16 are peripherally rotated toward each other, as by means of an electric motor 18 transmitting power to corresponding ends of the shafts 15b and 16b by means of drive mechanism indicated generally at 19, FIG. 5. It is preferred that the pitch of screw 16 be less than the pitch of screw 15, for example six inches as compared to 12 inches. 6

Shaft 16 passes through an outlet opening 20 in the front wall 11b of hopper 11, that is provided for the discharge of material from such hopper, and continues on through a discharge passage 21 in conduit 22 as the drive shaft of a conventional meat grinder mechanism 23.

As so placed, the two screws 15 and 16 serve to both mix material inserted into the hopper and convey it toward the discharge opening 20. Screw 15 serves to convey material from front to rear of the hopper, along one side thereof, and to transfer such material to the other screw 16 at the rear end of the hopper. For facilitating such transfer of material, screw 15 is preferably provided with a paddle 24 at its rear end, that serves to lift material out of the trough 12 and force it over into the rear end of screw 16.

To guard against continual forcing of material through outlet opening 20 of the hopper and into the passage 21 leading to grinder 23 if and when such grinder becomes clogged or otherwise inoperative for any reason, a bypass from discharge screw 16 to transfer screw 15 is preferably provided at the forward ends of such screws. This advantageously takes the form of a notch 25, FIG. 2, at the forward end of ridge 14, thereby providing a non-restricted path of flow of material from discharge screw to transfer screw and enabling the material within hopper 11 to idly circulate within and peripherally of such hopper until such time as the stoppage is corrected.

Figure 2:
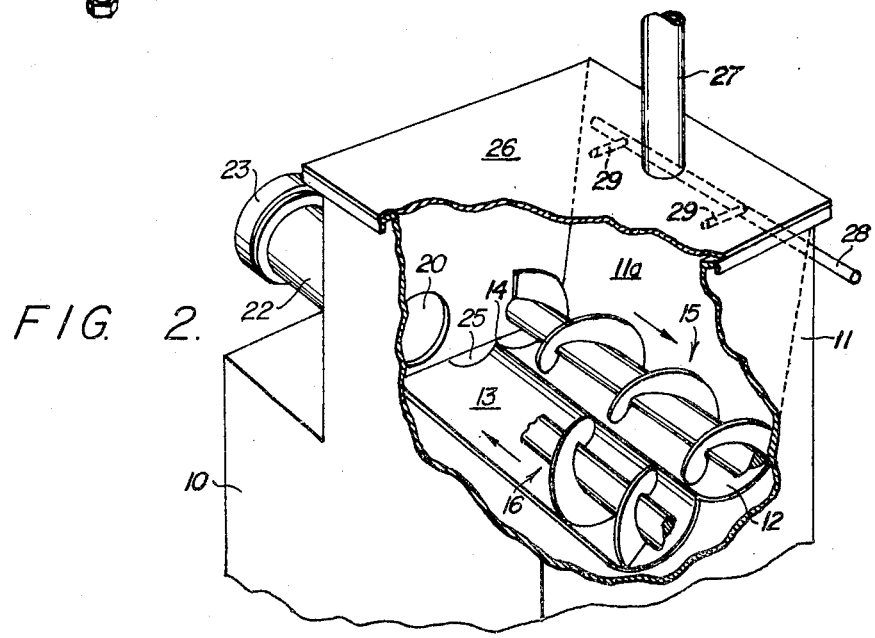

As shown in FIG. 2, the processing equipment, i.e. machine, comprises means to maintain the material in the hopper in a $CO_2$ atmosphere. Thus, a cover 26 is placed tightly over the otherwise open top of feed hopper 11 and material is charged into such hopper through a pipe 27. $CO_2$ gas is charged into the hopper through a manifold 28 and offtake pipes 29 leading therefrom to port openings through a hopper wall 11a.

The embodiment of FIG. 3 corresponds to that of FIG. 1, except for the interposing of a material-advancing pump 30 in the discharge passage leading from discharge outlet 20 to grinder 23 and for the accompanying rearrangement of such discharge passage so the grinder can be independently powered.

As illustrated in FIG. 3, passage 21 through conduit 22 leads directly to pump 30, which discharges through an outlet pipe 31 and pipe fitting 32 into the rear end of a second conduit 33 leading directly to grinder 23. In this instance, pump 30 is driven by the extension of conveyor screw shaft 16b, while grinder 23 is driven by a shaft (not shown) extending from a second electric motor 34.

The embodiment of FIG. 4 is similar to that of FIG. 3, except that the pump is eliminated and replaced with an elbow adapter pipe fitting 35 to provide a through flow passage leading from conduit 22 into pipe 31 and thence through pipe fitting 32 into a conduit 33 and grinder 23.

Whereas the invention is here illustrated with respect to specific embodiments thereof, it is to be understood that these merely represent the best mode presently contemplated of carrying out the invention in practice and many variations are possible without departing from the claimed inventive concepts.

I claim:

1. Apparatus for processing meat with carbon dioxide, comprising a mixing vessel of hopper configuration normally closed by a separate, top cover; mixing conveyor screws arranged side-by-side in fixed relationship at the bottom of the vessel for mixing meat introduced into the vessel and for discharging mixed meat from the vessel; means whereby meat may be continuously fed into the closed vessel above said mixing screws; a discharge outlet in a wall of the vessel in substantial alignment with one of the screws at one end thereof, said one screw being arranged to convey meat and to force it through the discharge outlet; means for rotating the screws; and means for continuously feeding carbon dioxide into the vessel near and along the top of the hopper interior of the vessel, said means comprising a plurality of flow passages extending into the vessel from the exterior thereof so that discharge therefrom is located at or near and along the top of said hopper interior of the vessel, said hopper interior of the vessel being open and unobstructed from the location of discharge of said flow passages to said mixing screws, whereby meat introduced into said vessel will fall freely into said mixing screws and carbon dioxide introduced into said vessel through said flow passages will fall freely with and onto said meat as the mixing screws operate below the free-fall hopper interior of said vessel.

2. Apparatus according to claim 1, wherein the flow passages for feeding carbon dioxide extend substantially horizontally through a side wall of the vessel from a supply manifold.

3. A twin screw, continuous, processing machine in accordance with claim 1, wherein the bottom of the vessel is formed as twin troughs for receiving the respective conveyor screws, said troughs being separated by a ridge; and material transferring means at the ends of said screws remote from the discharge outlet for transferring material from the tranfer screw to the discharge screw.

4. A twin screw, continuous, processing machine in accordance with claim 3, wherein the material transferring means comprises a paddle member secured to the transfer end of the transfer screw.

5. A twin screw, continuous, processing machine in accordance with claim 3, additionally including material by-pass means between the discharge end of the discharge screw and the corresponding end of the transfer screw.

6. A twin screw, continuous, processing machine in accordance with claim 5, wherein the by-pass means comprises a notch in the ridge separating the troughs.

7. A twin screw, continuous, processing machine in accordance with claim 1, wherein the vessel is a feed hopper; the machine includes material-processing mechanism; and conduit means connects the discharge outlet from the hopper with said mechanism.

8. A twin screw, continuous, processing machine in accordance with claim 7, wherein the one conveyor screw is provided with an extension connected with the material-processing mechanism so said mechanism will be driven by the means for rotating the screws.

9. A twin screw, continuous, processing machine in accordance with claim 7, wherein a material-advancing pump is interposed in the conduit means.

10. A twin screw, continuous, processing machine in accordance with claim 9, wherein the material-processing mechanism is disposed at at lower level than the discharge outlet; and said mechanism is provided with drive means independent of the means for rotating the screws.

11. A twin screw, continuous, processing machine in accordance with claim 1, wherein the twin screws are arranged peripherally about the bottom of the vessel.

12. A twin screw, continuous, processing machine in accordance with claim 1, wherein the transfer screw has pitch about twice the pitch of the discharge screw.

* * * * *